(No Model.) 3 Sheets—Sheet 1.

E. H. HEATH & F. W. MOORE.
REAPING AND MOWING MACHINE.

No. 328,029. Patented Oct. 13, 1885.

Witnesses:
Jas F. DuHamel
Walter S. Dodge

Inventors:
Edward H. Heath,
Frank W. Moore,
by Dodge & Son,
Attys.

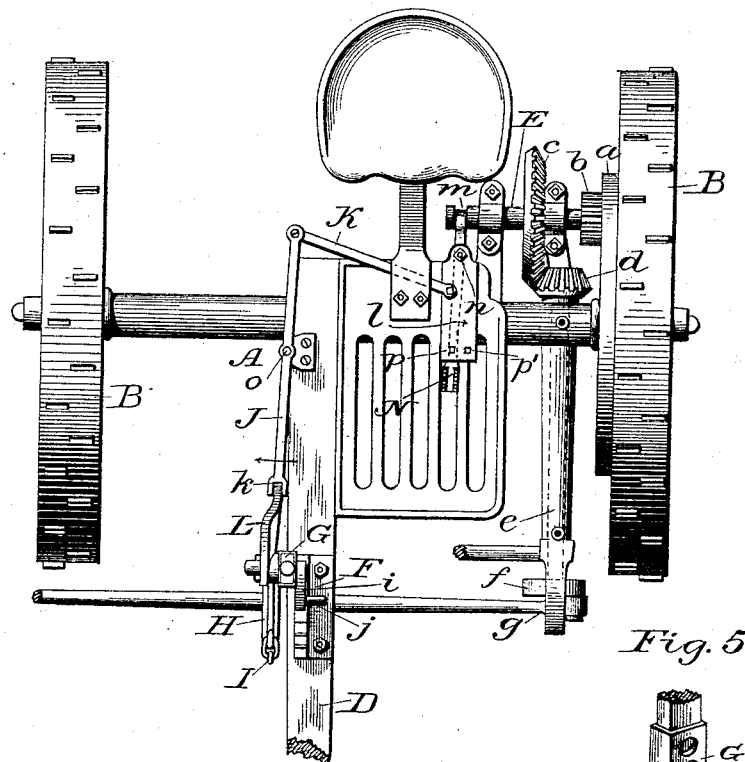

UNITED STATES PATENT OFFICE.

EDWARD H. HEATH AND FRANK W. MOORE, OF WAUPUN, WISCONSIN.

REAPING AND MOWING MACHINE.

SPECIFICATION forming part of Letters Patent No. 328,029, dated October 13, 1885.

Application filed October 9, 1884. Serial No. 145,079. (No model.)

*To all whom it may concern:*

Be it known that we, EDWARD H. HEATH and FRANK W. MOORE, of Waupun, in the county of Fond du Lac and State of Wisconsin, have invented certain new and useful Improvements in Reaping and Mowing Machines, of which the following is a specification.

This invention relates to reaping and mowing machines, and is designed as an improvement upon that for which we filed application for Letters Patent of the United States on the 11th day of July, 1884, Serial No. 137,416.

Figure 1:
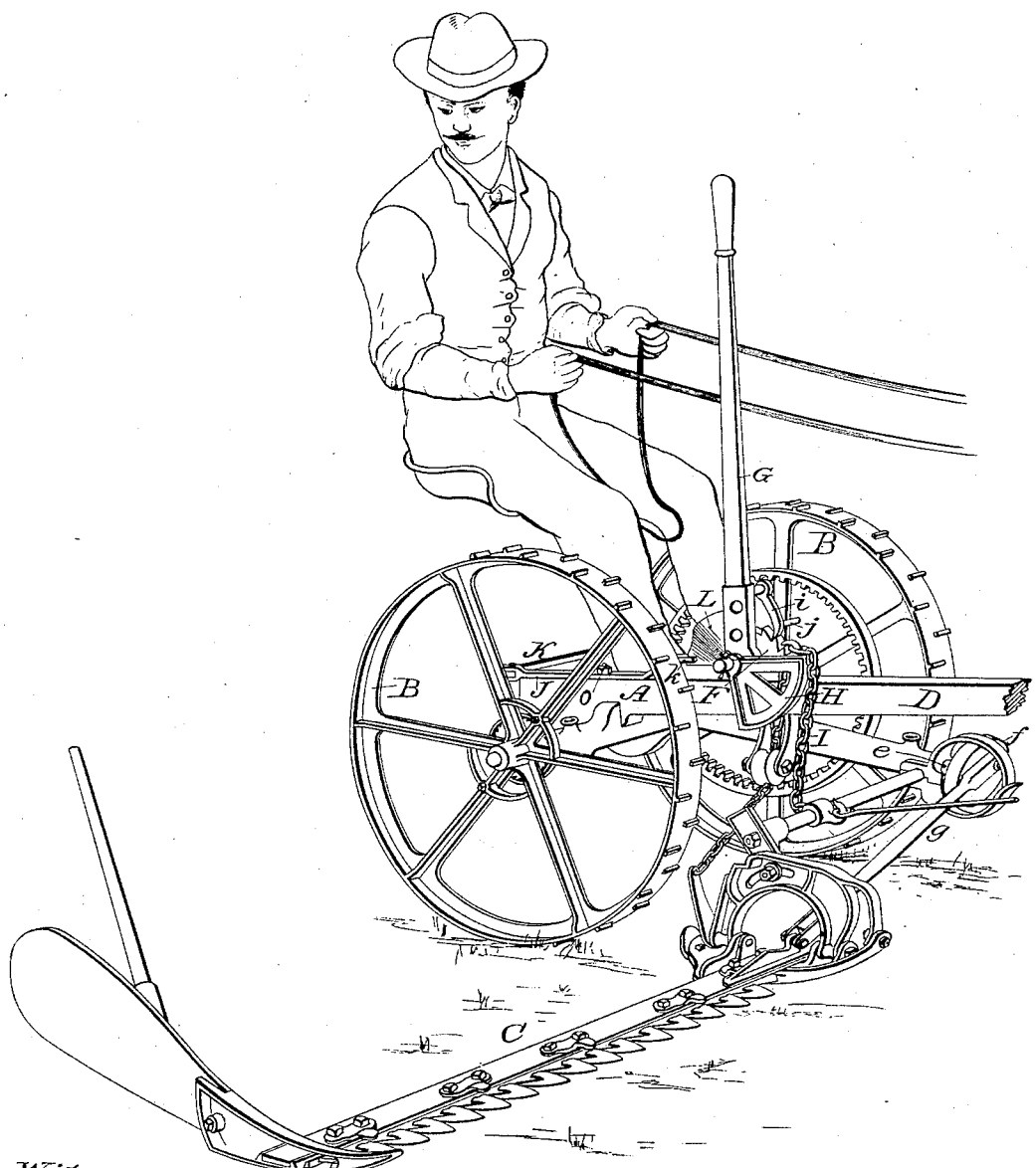
Figure 6:
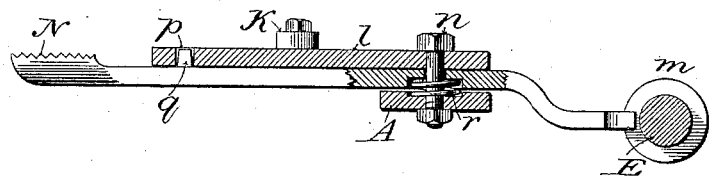
Figure 7:
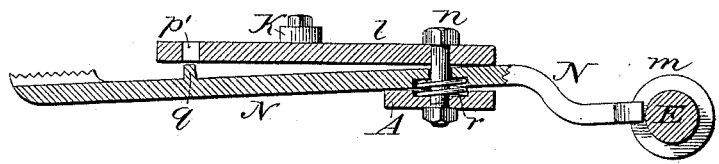
Figure 8:
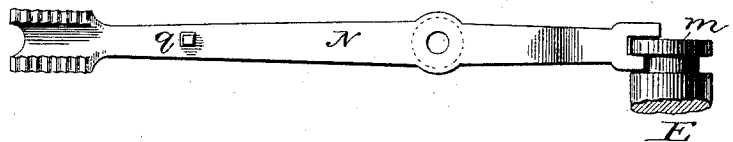

In the accompanying drawings, Figure 1 is a perspective view of a mowing-machine embodying our invention. Fig. 2 is a top plan view of the same; Figs. 3 and 4, perspective views of the lifting-lever and attendant parts in different positions; Fig. 5, a similar view of a slightly modified form of the same; Figs. 6, 7, and 8, views illustrating certain details of construction.

The object of our invention, as in the case above referred to, is to allow the cutter-bar to be raised to a predetermined angle without disconnecting the cutter-bar from the driving mechanism, and by a further movement of the same lever used for raising the cutter-bar the operating mechanism is automatically disconnected and all liability of breakage and injury is avoided.

The invention also consists in means whereby the gearing may be disconnected by the foot without elevating the cutter-bar.

In the drawings, A indicates the main frame of a mowing or reaping machine of common form, carried by wheels B B, and provided with cutter-bar C and tongue D, as is usual in this class of machines, and as these features form no part of the present invention their construction is immaterial; or, in other words, the invention may be applied with slight modification of details to all machines of this class.

Upon one of the driving-wheels B is an annular gear ring or wheel, *a*, which meshes with and gives motion to a smaller gear-wheel, *b*, on a shaft, E, mounted in the frame A, as clearly shown in Fig. 2. Shaft E also carries a bevel-pinion, *c*, somewhat larger than gear-wheel *b*, which meshes with and gives motion to a similarly-beveled gear-wheel, *d*. From pinion *d* motion is communicated by means of shaft *e*, crank-wheel *f*, and pitman *g* to a cutter-bar, as is usual. F indicates a curved rack, mounted on the tongue D, and which has pivoted to it the hand-lever G, as shown in Figs. 1 and 2, said lever being also provided with a quadrant, H, which is rigidly affixed thereto, as indicated in Figs. 2, 3, and 4. Arc or quadrant H is grooved, as shown in Figs. 1 and 2, to receive and seat a chain or band, I, which, as the lever is moved backward upon its pivot, winds up on the quadrant and raises the cutter-bar off the ground to any desired angle, as is well understood. Lever G is provided with a pawl or dog, *i*, which engages with the rack F and holds the lever at any point to which it is moved by hand, said dog being provided with a foot-piece or arm, *j*, by which to disengage the dog from the rack and allow the forward movement of the lever when necessary and desirable.

J indicates a bar or rod pivoted to the main frame at *o*, as shown in Figs. 1 and 2, said bar or rod being provided at one end with a fork, *k*, while the other end connects with a similarly-pivoted bar or shifting-lever, *l*, by means of the pitman or bar K.

Mounted upon and moving with the lever G and quadrant H is a cam-shaped quadrant, L, which, as shown in Figs. 1, 2, and 3, works in the forked end *k* of the lever or bar J, and imparts a lateral movement to the same as the lever and quadrant are raised and lowered, and thereby also causing a similar movement of the shifting-lever *l* upon its pivot *n*, motion from lever J being communicated by pitman K to shifting-lever *l*.

Referring again to Fig. 2 it will be seen that the shaft E, on which the pinions *b c* are carried, is provided with a circumferential groove, *m*, and is adapted to be moved longitudinally through its boxes, so as to bring the pinion *c* into or out of engagement with pinion *d*, the pinion *b* being of such length that when the shaft is moved its greatest distance the pinion will remain in gear with the annular gear-ring *a*.

The gearing *b c d* may be inclosed within a casing, if desired.

The mechanism being constructed as above described the operation is as follows:

When the machine is cutting on even ground, the parts are in the position shown in Figs. 1, 2, and 3—that is to say, the lever G is upright and the forked end *k* of the lever J is at the lowest point of the cam-quadrant L. If, however, a small obstruction is met with, the hand-lever is thrown back a short distance, whereupon the cutter-bar will be elevated without disengaging the gearing or stopping the motion of the cutters; but should it be found that a higher elevation of the cutter-bar is necessary to clear a larger obstruction, (such an elevation as would break the machine were it not thrown out of gear,) a further movement of the lever G, to the position shown in Fig. 4, will raise the cutter-bar to a vertical or nearly vertical position, disengaging the gearing as the curve in the cam-quadrant passes through the fork end *k* of lever J. During the first part of the movement of the lever the straight portion only of the cam L passes between the forked end of the lever J, and consequently causes no movement of the latter; but upon a continuation of the movement of the lever the cam-surface of the quadrant engaging with the forked end of the lever J causes a sidewise or lateral motion of the lever upon its pivot *o*. The motion thus imparted to the shifting-lever N from lever J, through pitman K, causes the former to swing upon its pivot *n*, and carry with it the shaft E, upon which are mounted the pinions *b b*, and consequently, as a result of such movement, the pinion *c* is thrown out of engagement with pinion *d*, and motion of the cutter-bar stopped.

As shown in Fig. 5, the forked end *k* of the lever J may be dispensed with, and the end of said lever inserted in a groove, M, in the edge of the quadrant.

It is often desirable, when the machine is not working, that the gearing be disconnected and the cutter-bar allowed to rest upon the ground in order that repairs may be easily made, the machine properly oiled or cleaned, and other necessary duties performed without danger or inconvenience to the attendant; hence it is necessary to provide means whereby this may be accomplished.

Referring, now, to Fig. 2 it will be observed that the pivoted lever *l* is made quite broad at its forward end, and is provided with holes *p p'*. It will be further noticed that on the same pivot, *n*, upon which lever *l* is mounted there is a foot-lever, N, which engages with the collar *m* on shaft E. Said foot-lever N projecting slightly forward of lever *l*, and being provided on its upper surface with a slide or lug, *q*, engages with one or the other of the holes or openings *p p'* in lever *l*, as shown in Figs. 2, 6, and 7.

As shown in Figs. 6 and 7, the lower side of the lever N and the upper side of frame A are provided with sockets, where the pivot *n* passes through, and within said sockets is placed a strong spiral spring, *r*.

As shown in Figs. 2 and 6, the stud or lug *q* on the foot-lever N is in engagement with the hole or opening *p* in the plate or lever *l*, and, as a result, any movement of the lever *l* will cause a similar movement of the foot-lever N, and consequently of the shaft E, as the rear end of said foot-lever encircles the collar, as shown in Figs. 2, 6, and 7.

If, now, it should be desired to disconnect the gearing without in any way affecting the cutter-bar, the forward end of the foot-lever N is depressed and the spring *r* compressed at one side, as shown in Fig. 7, thus allowing the stud or lug *q* on lever N to be withdrawn from hole or opening *p*, and by slightly shifting the foot-lever upon its pivot *n* the gearing may be disconnected without any movement of the hand-lever G or lever *l*, and consequently without affecting the cutter-bar, which remains upon the ground.

In order to hold the parts disconnected in this position, the lug or stud *q* is caused to enter hole or opening *p'*, and thus effectually prevent any movement of the cutter-bar or of the gearing.

The mechanism will of course be modified in its details to suit different styles of reapers and mowers.

We are aware that it is not new to provide means for raising the cutter-bar and thereby automatically disconnecting the latter from the driving-gear when the cutter-bar is raised to a predetermined height, and we do not wish to be understood as claiming such idea, broadly; neither do we claim the construction of the clutching mechanism *per se*.

Having thus described our invention, what we claim is—

1. In a reaper, mower, or like machine, the combination of a cutter-bar, C, lifting-lever G, provided with cam-shaped quadrant L, shiftable pinion *c*, serving to transmit motion from the driving-wheel to the cutter-bar, shifting-lever *l*, connecting-rod K, and lever J, connecting the shifting-lever with the cam-shaped quadrant, as and for the purpose described.

2. In a reaper or mower, the combination of a cutter-bar, a lifting-lever therefor, a pivoted plate or bar connected with and adapted to be moved by the lifting-lever, and a foot-lever adapted to be automatically locked to the pivoted plate or bar and to be disconnected therefrom and operated by the foot of the driver, said foot-lever being connected with and arranged to operate a movable clutch or pinion to throw the cutter-bar into or out of gear.

3. In a reaper or mower, the combination of a cutter-bar, a lifting-lever therefor, a movable clutch or pinion for connecting or disconnecting the cutter-bar and gearing, and a foot-lever connected with and serving to move said clutch or pinion and adapted to be connected with or disconnected from the lifting-lever at will.

4. The combination, in a reaper, mower, or like machine, of a driving-wheel, a cutter-bar, a lifting-lever for the cutter-bar, a movable clutch or pinion intermediate between the cutter-bar and driving-wheel, an oscillating plate connected with the lifting-lever and provided with recesses, a foot-lever connected with the movable clutch or pinion and provided with a stud to enter one or the other of the recesses of the oscillating plate, and a spring bearing against the foot-lever and serving to hold it normally in engagement with the oscillating plate.

5. The combination, substantially as herein described and shown, of driving-wheel B, cutter-bar C, lifting-lever G, provided with cam L, lever J, rod K, shifting-plate $l$, provided with recesses $p$ $p'$, foot-lever N, provided with stud $s$, spring $r$, and sliding shaft E, provided with pinions $b$ $c$, all combined and arranged to operate substantially as described and shown.

EDWARD H. HEATH.
FRANK W. MOORE.

Witnesses:
J. A. KELLEY,
H. C. CARTER.